May 29, 1923.

A. G. MASS

VEHICLE WHEEL

Filed Dec. 12, 1921    2 Sheets-Sheet 1

1,456,642

INVENTOR:
August G. Mass,

May 29, 1923.
A. G. MASS
1,456,642
VEHICLE WHEEL
Filed Dec. 12, 1921   2 Sheets-Sheet 2
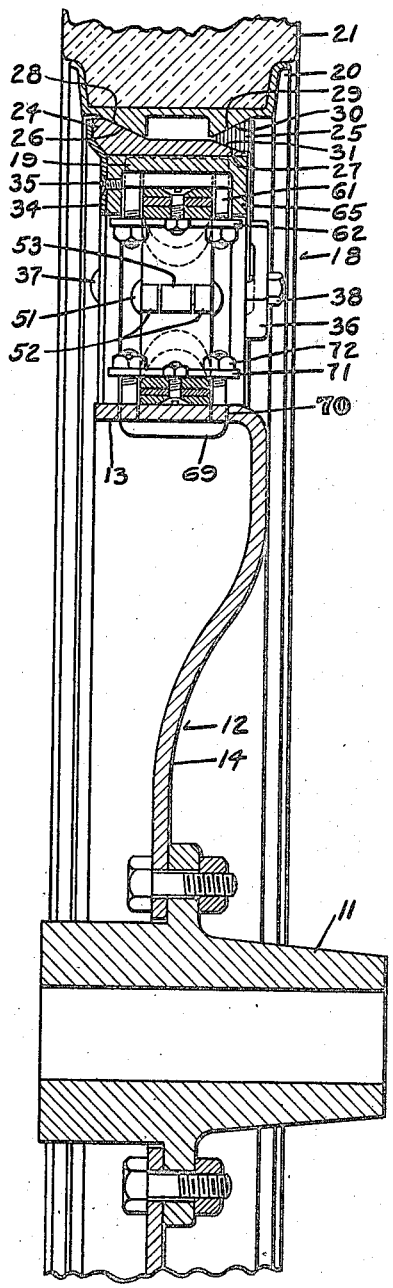
Fig. 3.
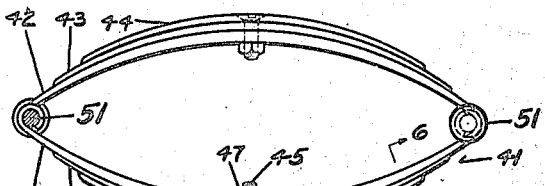
Fig. 4.
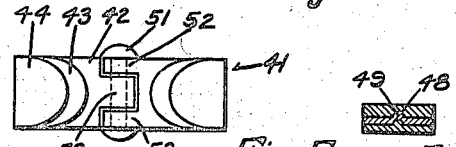 
Fig. 5.   Fig. 6.
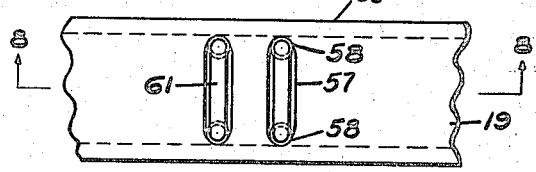
Fig. 7.
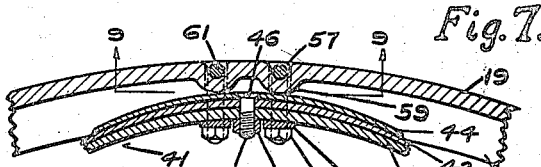
Fig. 8.
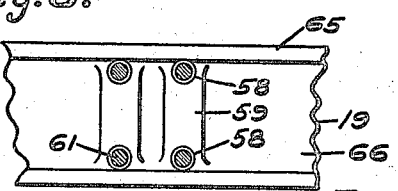
Fig. 9.
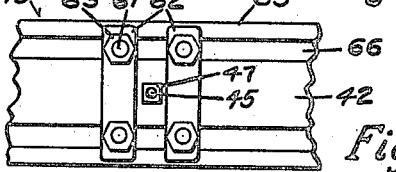
Fig. 10.
INVENTOR:
Augras G. Mass,
by his Attorney.

Patented May 29, 1923.

1,456,642

UNITED STATES PATENT OFFICE.

AUGUST G. MASS, OF CINCINNATI, OHIO.

VEHICLE WHEEL.

Application filed December 12, 1921. Serial No. 521,657.

*To all whom it may concern:*

Be it known that I, AUGUST G. MASS, a citizen of the United States, residing at Cincinnati, in the county of Hamilton and State of Ohio, have invented certain new and useful Improvements in Vehicle Wheels, of which the following is a specification.

My invention relates to vehicle wheels, and has for its object the provision of novel means whereby resiliency of the wheel is obtained by devices placed between the rim and the hub of the wheel; further, to provide a series of full elliptic springs between a hub section and a rim section of the wheel arranged in novel manner to provide resiliency for the wheel, and the invention will be further readily understood from the following description and claims, and from the drawings, in which latter:

Fig. 3 is a cross-section of my improved device, partly broken away, taken on the line 3—3 of Fig. 1.

Fig. 4 is a side elevation of one of the full elliptical springs, one of the end shackles thereof being partly broken away.

Fig. 5 is an end elevation of the same.

Fig. 6 is a cross-section of a detail of the same, taken on the line 6—6 of Fig. 4.

Fig. 7 is a plan detail showing the connections of the full elliptical spring with the rim of the outer section of the wheel.

Fig. 8 is a vertical section of the same, taken on the line 8—8 of Fig. 7.

Fig. 9 is a cross-section of the same, taken in the plane of the line 9—9 of Fig. 8, and, Fig. 10 is an inside elevation of the same.

Figure 1:
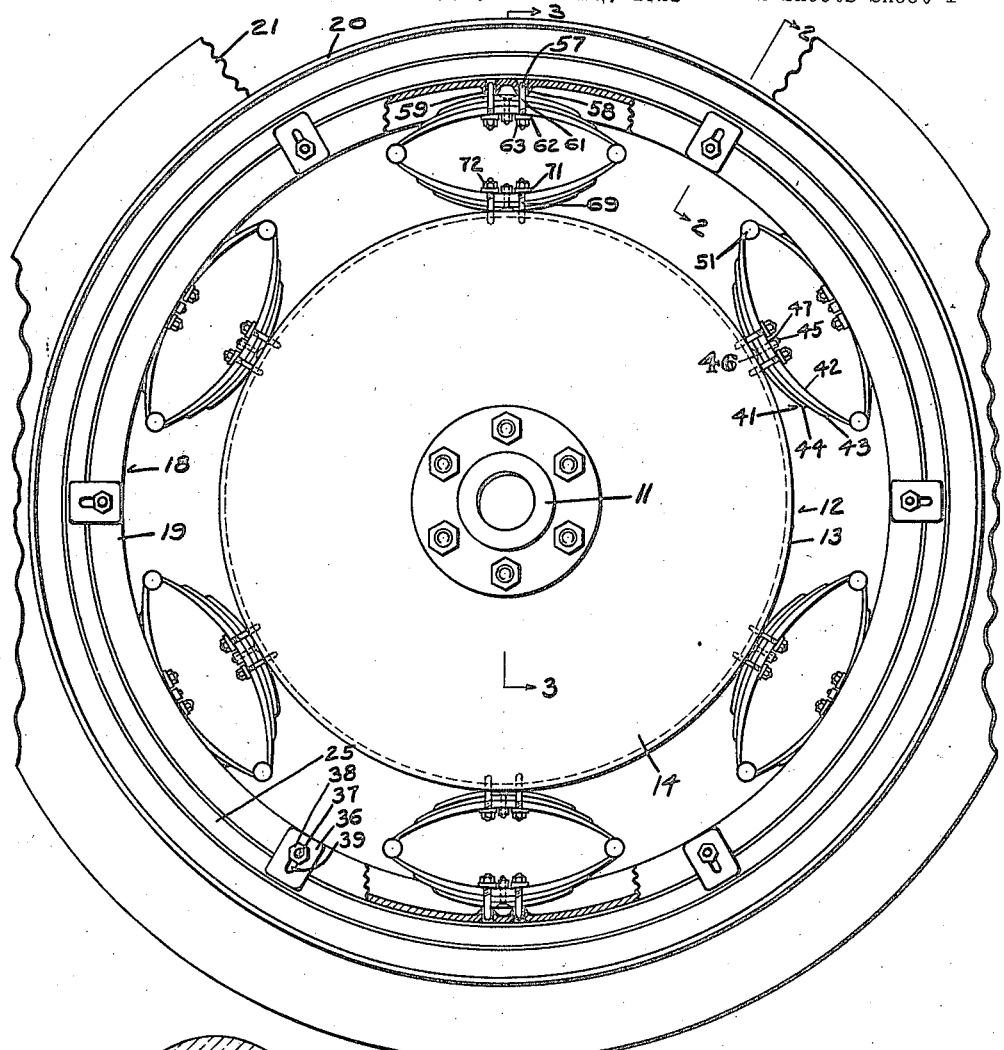
Fig. 1 represents a side elevation of my improved device, partly broken away.
Figure 2:
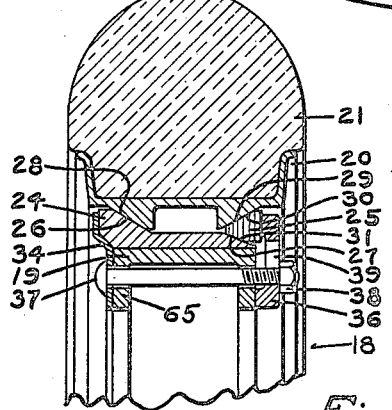
Fig. 2 is a cross-section of the outer section of the same, taken on the line 2—2 of Fig. 1.

The hub of the wheel is shown at 11, and may be of any suitable or desired construction to fit either the front axle or rear axle of the vehicle, for instance an automobile, or other self-propelled vehicle.

The hub is part of an inner section 12 of the wheel. This inner section may comprise an inner rim 13, or flange, an intermediate support 14, shown as a web of pressed steel, is shown as connecting the hub and peripheral portion of the inner section of the wheel.

There is an outer wheel section 18, which comprises an outer rim 19, supporting a suitable felly 20, which may be of suitable or desirable construction for receiving a tire 21. This tire is shown of solid rubber, but may, if desired, be a pneumatic tire or of other suitable construction and material.

I have shown a demountable arrangement between the felly and the outer rim, comprising an annular wedge-band 24, supported about the outer periphery of the outer rim, and a wedge-ring 25. The wedge-band has wedge-faces 26, 27. The felly has wedge-faces 28, 29, the wedge-face 28 coacting with the wedge-face 26, and the wedge-faces 30, 31, of the wedge-ring coacting with the wedge-faces 29, 27. A ring-plate 34 is secured to the outer rim, as by screws 35, and forms a stop for the wedge-band.

Clamps 36 engage the wedge-ring, bolts 37 and nuts 38 acting on the clamps to urge the wedge-ring into wedging relation with the wedge-band and the felly for clamping the felly in place. The clamps are releasable from the wedge-ring by movement thereof lengthwise of their slots 39 along the bolts 37 for placing the same out of range of the wedge-ring whereby the latter and the felly may be removed. Other forms of felly securing or demountable attaching means may be employed, as desired.

A series of full elliptical springs 41 are located between the inner or hub section of the wheel and the outer or rim section of the wheel. These elliptical springs are shown as constructed of semi-elliptical sections of a plurality of spring-leaves 42, 43, 44, each, the inner ones 42 of which are shown heavier than the leaves outside of the same, the leaves of the respective semi-elliptical sections of each spring being connected by a bolt 45, having a countersunk head 46, and a nut 47 clamping spring-leaves together.

Means are provided for preventing relative lateral displacement between the spring-leaves as by providing the same adjacent their ends respectively with grooves 48 and tongues 49 received in the grooves, the tongues and grooves extending lengthwise of the spring-leaves, preferably, however, only adjacent the ends of the same. The ends of the inner leaves are connected by shackles 51, received through eyes 52, 53, in the ends of the respective springs, the eye 53 at each end being received between the eyes 52.

The means for securing the elliptical springs to the respective wheel members is preferably such as to permit a slight rocking motion between the springs and the members to which they are respectively connected. Thus the outer rim 19 is provided with cross-grooves 57, at the respective ends of which holes 58 are located, the cross-grooves for each of the springs being preferably close together, and forming cross-ribs 59, upon which the middle portions of the outer sections of the full elliptical springs are received. Clips 61, shown as U-clips, have their limbs received through the holes 58, with the bases of the clips located in the cross-grooves. The outer sections of the springs are received between the limbs. Plates 62 have holes therein through which said limbs are received, and nuts 63 clamp the outer sections of the springs upon the cross-ribs 59.

The rim is provided with radially inwardly extending flanges 65 at its edges to form an inner annular groove 66. The outer sections of the springs are located in this groove, with the limbs of the clips located between said outer sections and said flanges, to aid in lateral support of the springs.

The inner sections of the full elliptical springs are secured to the inner section of the wheel by similar U-clips 69, the limbs of which are received through holes 70 in the inner flange or rim 13. The inner sections of the full elliptical springs are received between these limbs, cross-pieces 71 being received at the outer faces of the inner sections of the springs. The limbs of the inner U-clips are received through holes in these cross-pieces, nuts 72 clamping the inner sections of the springs to the inner rim.

The convexly curved faces of the inner sections of the springs coact with the reversely convexed face of the outer periphery of the inner rim, and the convexly curved faces of the outer sections of the springs coact with the cross-ridges 59, to permit a slight rocking between said faces, resisted and limited by the U-clips.

The U-clips and the bolts and shackles connecting with the springs are preferably slightly softer and slightly more wearable than the spring-leaves, so as to induce any wear there may be in said clips, bolts and shackles, so as to save wear on the spring-leaves and provide for ready replacement of worn parts.

The grooves in the outer periphery of the outer rim are provided for accommodating the bases of the outer U-clips, so as to leave an unprotruding annular surface for said outer periphery for the reception of the wedge-band 24.

In operation, when weight is applied upon the hub of the wheel, the lower full elliptical springs will have a tendency to flatten and the upper elliptical springs will have a tendency to expand, while the stress on the side elliptical springs will be in different directions crosswise of the springs, depending on their locations, the slight rocking movement of the springs with relation to their supports permitting such slight yield or rocking motion as may be necessary to compensate for the yield of the springs, but being insufficient to act detrimentally upon the tractive powers or functions of the wheel, and insufficient to permit an undue climbing movement or relation between the inner and outer sections of the wheel, regardless of whether the wheel is used as a driven wheel or as a driving wheel in the propulsion of the vehicle.

The construction is such that lateral yield between the outer section and the inner section of the wheel is avoided, whereas resilient yield in all radial directions is permitted. The construction is such further that shocks due to striking of stones or ruts are absorbed in the wheel and easy riding of the vehicle is assured.

Having thus fully described my invention, what I claim as new, and desire to secure by Letters Patent, is:

1. In a vehicle wheel, the combination of an inner wheel member having a peripheral flange, an outer wheel member comprising an annular rim, said flange and said rim having an annular space between them, and a series of full elliptical springs in annular arrangement in said annular space, said rim provided with inwardly extending indentations, U-clips, the bases of said clips located in said indentations, an annular band received about said rim and said bases and having support on said rim, U-clips received through said annular flange, connecting means between said first-named U-clips and one of the halves of said full elliptical springs, and connecting means between the said second-named U-clips and the other of the halves of said full elliptical springs.

2. In a vehicle wheel, the combination of an inner wheel member having an annular peripheral flange, an outer wheel member comprising an annular rim provided at its respective edges with radially inwardly extending flanges to form an annular groove, said annular peripheral flange and said annular rim having an annular space between them, said annular rim provided with outer recesses and inner ridges in said groove, and a series of elliptical springs arranged annularly in said annular space and supported respectively on said ridges and the outer periphery of said flange to form rocking supports at both sides of said elliptical springs between said elliptical springs and said rim and said flange respectively.

3. In a vehicle wheel, the combination of an inner wheel member and an outer wheel member having an annular space between them in the plane of said members, a series of full elliptical springs annularly arranged in said annular space, each of the halves of said springs comprising leaves provided with complemental tongues and grooves between them extending lengthwise of said leaves, connecting means between the inner series of halves of said springs and said inner wheel member, and connecting means between the outer series of halves of said springs and said outer wheel member, said connecting means engaging the edges of said halves at each side of the middle of said halves, and constructed and arranged to resist lateral displacement between said spring leaves and between said springs and said wheel members.

4. In a vehicle wheel, the combination of an inner wheel member and an outer wheel member having an annular space between them in the plane of said members, said inner wheel-member having an outer peripheral face, said outer wheel-member having an inner peripheral face provided with inwardly extending cross-ridges, and a series of full elliptical springs arranged in equally spaced-apart relation in said annular space, the respective halves of said springs supported at their middles respectively on said outer peripheral face and said cross-ridges, and means at said middles of said halves securing said springs respectively to said inner wheel-member and said outer wheel-member, and constructed and arranged to form rocking connections between said respective halves and said respective wheel-members.

5. In a vehicle wheel, the combination of an inner wheel-member having an outer peripheral face, an outer wheel-member comprising an annular rim provided with annular radially inwardly extending flanges to form an inwardly opening annular groove, said outer peripheral face and said rim having an annular space between them, said rim provided with outer cross-grooves at its outer periphery to form inwardly extending cross-ridges at its inner periphery and apertures at the ends of said grooves, a series of full elliptical springs annularly arranged in said annular space, U-clips, the bases of said U-clips located in said cross-grooves and the limbs of said U-clips received through said apertures between the sides of the outer halves of said springs and said flanges to connect said springs and said outer wheel-member, and U-clips connecting said springs and said inner wheel-member.

In testimony whereof, I have hereunto signed my name in the presence of two subscribing witnesses.

AUGUST G. MASS.

In presence of—
 Louis P. Murphy,
 Delma Wernsing.